Aug. 12, 1958    J. HEFFRON ET AL    2,847,220
FISH HOOK
Filed Aug. 6, 1953

INVENTORS
JOSEPH HEFFRON
BY LILLIAN HEFFRON

Patrick D Beavers
ATTORNEY

United States Patent Office 2,847,220
Patented Aug. 12, 1958

2,847,220

FISH HOOK

Joseph Heffron and Lillian Heffron, Fairbanks, Territory of Alaska

Application August 6, 1953, Serial No. 372,631

1 Claim. (Cl. 43—44.83)

This invention relates to improvements in fish hooks, the principal object being to provide a fish hook which can be readily attached and detached with respect to a fishing line.

The present invention has been developed as a result of difficulty in attaching fish hooks to fishing lines, because many fishermen do not know how to properly connect hooks detachably to fishing lines and the result is that the hooks are cut off with portions of the fishing line, thus shortening the fishing line considerably over a period of time.

Another important object of the invention is to provide a fishing hook with a laterally disposed spiral extension of the shank, to which a loop formation on the fishing line can be placed, with little likelihood of the hook becoming displaced during fishing operations, but which will permit the hook to be easily removed when the fisherman has finished fishing.

These and various other objects and advantages of the invention will become apparent to the reader of the following description.

Figure 1:
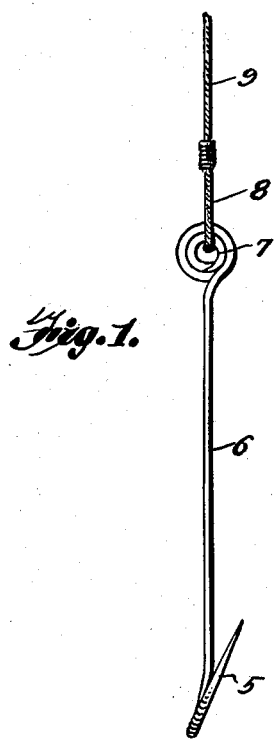
Figure 1 is a front elevational view of the hook attached to a fishing line.
Figure 2:
Figure 2 is a side elevational view of the fish hook attached to a fishing line.
Figure 3:
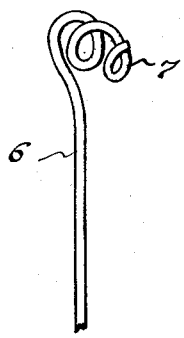
Figure 3 is a perspective view of the spiral end of the fish hook shank.

Referring to the drawings wherein like numerals designate like parts, it can be seen, that numeral 5 denotes a fish hook having an elongated shank 6. The upper end of the shank 6, instead of having a conventional eye or other conventional line attaching means, is bent laterally and formed into a spiral formation 7, with the convolutions of the spiral substantially spaced so as to accommodate the looped end 8 of a fishing line 9 and permits the same to be moved along the convolutions from the free end of the spiral formation to a position adjacent the shank. It will be apparent that the axis of the spiral formation is at a right angle with respect to the axis of the shank. It will also be seen that the hook extends in a direction diametrically opposite to the direction of the spiral formation with respect to the shank.

It can be seen, that the loop 8 can be fed along the spiral formation 7 until upper end of the shank 6 is reached. Thus the line 9 is connected to the shank of the fish hook and will not become displaced accidentally.

It is obvious that the line 9 can not only be easily attached to the fish hook, but just as easily removed.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A fish hook structure comprising a shank, a fish hook formed integrally with the lower end of the shank and extending laterally therefrom, and a spiral line attaching formation on such shank at the upper end thereof, said spiral formation being formed integrally with the material of the shank and having its axis extending at a right angle to the axis of the shank and radially in a direction diametrically opposite to the direction of said hook, and said spiral formation having a free end and having its convolutions freely spaced from each other to permit a fishing line loop to be moved along the convolutions from the free end of the spiral formation to a position adjacent said shank.

References Cited in the file of this patent

UNITED STATES PATENTS

| 103,645 | Muscroft | May 31, 1870 |
| 1,451,656 | Halferty | Apr. 10. 1923 |
| 1,065,204 | Beals | June 17, 1913 |
| 2,570,468 | Matthes | Oct. 9, 1951 |
| 2,592,664 | De Mello | Apr. 15, 1952 |

FOREIGN PATENTS

| 614 | Great Britain | 1909 |
| 549,166 | Germany | Apr. 26, 1932 |